3,200,075
LACTONE AMIDES IN LUBRICATING OILS
Donald J. Anderson, San Anselmo, Calif., assignor to California Research Corporation, San Francisco, Calif., a corporation of Delaware
No Drawing. Filed Feb. 19, 1963, Ser. No. 259,720
6 Claims. (Cl. 252—51.5)

This invention pertains to lubricating oil compositions having incorporated therein metal-free detergents.

Present day internal combustion engines operate at high speeds and high compression ratios. When used in the so-called city stop-and-go driving, which includes the greater part of the driving conditions for a large percentage of today's automobiles, the internal combustion engines do not reach the most efficient operating temperature. Under city driving conditions, large amounts of partial oxidation products are formed, and reach the crankcase of the engine by blowing past the piston rings. Most of these partial oxidation products are oil-insoluble, tending to form deposits on the various operating parts of the engine, such as the pistons, piston rings, etc. For the purpose of preventing the deposition of these products on the various engine parts, it is necessary to incorporate detergents in the lubricating oil compositions, thus keeping these polymeric products highly dispersed in a condition unfavorable for deposition on metals.

For the most part, the various detergents which are added to crankcase oils to reduce this formation of sludges and varnishes are metal organic compounds, particularly those compounds wherein the metal is linked to an organic group through an oxygen atom. Although these metal-containing organic compounds have some effectiveness as detergents for dispersing the precursors of deposits within the oil itself rather than permitting them to form added deposits on the engine parts, they have the disadvantage of forming ash deposits in the engine. These ash deposits lower engine performance by fouling spark plugs and valves, and contribute to preignition.

It is a particular object of this invention to provide lubricating oil compositions which are compounded with metal-free detergents.

Therefore, in accordance with this invention, it has been discovered that lubricating oil compositions particularly useful for heavy duty service are obtained by incorporating amides of alkylbutyrolactone-α-acetic acid in oils of lubricating viscosity.

By the use of lubricating oil compositions containing the amides of alkylbutyrolactone-α-acetic acid described herein, diesel and gasoline engine parts remain remarkably free of deposits and varnish, even under severe operating conditions.

The compounds described herein as effective detergents in lubricating oil compositions are also useful as detergents in fuel compositions, such as burner fuel compositions, and motor fuel compositions, for example, in gasolines and in diesel fuels.

These amides, which are new compounds, are derivatives of acids of the formula:

$$\begin{array}{c} R_2 \quad H \\ | \quad\quad | \\ R_1-C\!-\!-\!-\!C-R_3 \\ | \quad\quad | \\ O \quad\quad CHCH_2COOH \\ \diagdown \;\; \diagup \\ C \\ \| \\ O \end{array}$$

wherein $R_1$, $R_2$, and $R_3$ are hydrogen or alkyl radicals containing from 1 to 300 carbon atoms. The total number of carbon atoms in $R_1$, $R_2$ and $R_3$ is preferably at least 10 and no more than 300 carbon atoms, more preferably from 12 to 100 carbon atoms.

A method by which these lactones of 2-hydroxyalkyl succinamides can be prepared is exemplified by reacting an olefinic hydrocarbon with dimethyl bromosuccinate, followed by reacting the resulting lactone of 2-hydroxyalkylsuccinic acid with an amine.

The amides of the above-described alkylbutyrolactone-α-acetic acid are those derived from ammonia or amines, including aliphatic, cyloaliphatic, and aromatic monoamines, poly amines and heterocyclic amines. In any case, the amino group reacting with the carboxyl groups to form the amide must be a primary or secondary amino group.

The resulting amides include those of the formula:

$$\begin{array}{c} R_2 \quad H \\ | \quad\quad | \\ R_1-C\!-\!-\!-\!C-R_3 \\ | \quad\quad | \\ O \quad\quad CHCH_2CONHR \\ \diagdown \;\; \diagup \\ C \\ \| \\ O \end{array}$$

wherein $R_1$, $R_2$, and $R_3$ are the same as defined hereinabove; and R is hydrogen or the residue of an amine radical having from 1 to 20 carbon atoms, preferably from 2 to 12 carbon atoms and from zero to 10 nitrogen atoms.

The preferred amides of the alkylbutyrolactone-α-acetic acid of the invention are those derived from polyamines. Especially preferred are ethylene diamine and the condensation products of ethylene diamine, such as ethylene triamine, piperazine, triethylene triamine, tetraethylene pentamine, heptaethylene octamine, nonaethylene decamine, N-aminoethyl piperazine, etc. Mixtures of the condensation products of ethylene diamine of various molecular weights which are commercially available are especially preferred.

Of particular preference as lubricating oil additives are the gamma alkylbutyrolactones wherein the gamma alkyl radical contains from 12 to 300 carbon atoms; that is, wherein $R_1$ in the above formula is an alkyl radical containing from 12 to 300 carbon atoms, and $R_2$ and $R_3$ are hydrogen.

Other polyamines are exemplified as follows: ethylene diamine, diethylenetriamine, tetraethylene pentamine, nonoethylene decamine, dipropylene triamine, tetrabutylene pentamine, hydroxyethylethylenediamine, etc.

Lubricating oils which can be used as base oils include a wide variety of lubricating oils, such as naphthenic base, paraffin base, and mixed base lubricating oils, other hydrocarbon lubricants, e.g., lubricating oils derived from coal products, and synthetic oils, e.g., alkylene polymers (such as polymers of propylene, butylene, etc., and the mixtures thereof), alkylene oxide-type polymers (e.g., propylene oxide polymers) and derivatives, including alkylene oxide polymers prepared by polymerizing the alkylene oxide in the presence of water or alcohols, e.g., ethyl alcohol, dicarboxylic acid esters (such as those which are prepared by esterifying such dicarboxylic acids as adipic acid, azelaic acid, suberic acid, sebacic acid, alkanol succinic acid, fumaric acid, maleic acid, etc., with alcohols such as butyl alcohol, hexyl alcohol, 2-ethyl hexyl alcohol, dodecyl alcohol, etc.), liquid esters of acids of phosphorus, alkyl benzenes, (e.g., monoalkyl benzene such as dodecyl benzene, tetradecyl benzene, etc.), and dialkyl benzenes (e.g., n-nonyl 2-ethyl hexyl benzene); polyphenyls (e.g., biphenyls and terphenyls), alkyl biphenyl ethers, polymers of silicon (e.g., tetraethyl silicate, tetraisopropyl silicates, tetra(4-methyl-2-tetraethyl) silicate, hexyl (4-methyl-2-pentoxy) disiloxane, poly(methyl) siloxane, poly (methylphenyl) siloxane, etc.).

The above base oils may be used individually or in combinations thereof, wherever miscible or wherever made so by the use of mutual solvents.

The amides of alkylbutyrolactones-α-acetic acid can be used in oils of lubricating viscosity in amounts of 0.1% to 30% by weight, preferably 0.25% to 5% by weight.

The preparation of the lactones of the succinamides described herein is illustrated in the following examples.

EXAMPLE I

*Preparation of the methyl ester of polybutenylbutyrolactone-α-acetic acid*

A mixture of 93.8 grams (0.1 mol) of a polybutene (molecular weight of about 840) in 100 ml. heptane, 225 grams (1 mol) of dimethyl bromosuccinate, and 1.46 grams (0.01 mol) of di-t-butyl peroxide was charged to a rocker bomb, and the vessel purged with nitrogen. The reaction mixture was heated at 130° C. with agitation for 5 hours, then cooled to room temperature, and the methyl bromide vented to the atmosphere. The reaction mixture was vacuum distilled to remove the heptane and the unreacted dimethylbromosuccinate.

Infrared analysis of the product showed the spectrum characteristic of the lactone (1780 cm.$^{-1}$) and the ester (1735 cm.$^{-1}$).

EXAMPLE II

*Preparation of the methyl ester of dodecylbutyrolactone-α-acetic acid*

A mixture of 98.5 grams (0.438 mol) of dimethyl bromosuccinate, 14.7 grams (0.0875 mol) 1-dodecene, 1.0 gram (0.00875 mol) of acetyl peroxide in 9 ml. of dimethyl phthalate, and 50 ml. benzene was heated with agitation for 4 hours at 90° C. The benzene and unreacted dimethyl bromosuccinate were removed by distillation at reduced pressure, followed by heating the residual yellow oil for 10 minutes at 195–205° C. at an absolute pressure of 2 mm. Hg. The final residue was crystallized from an ether-pentene solvent, resulting in a light brown waxy solid having a melting point range of 32–37° C. Infrared analysis of this product showed the spectrum characteristics of a lactone at 1775 cm.$^{-1}$ and the ester at 1735 cm.$^{-1}$.

Further purification resulted in white crystals which had a melting point of 43–45° C. Elemental analysis showed—

Calculated: 68.40% C; 10.14% H. Found: 68.35% C; 8.19% H.

The following equations exemplify the reactions of Example II.

(1)
$$CH_3(CH_2)_9CH=CH_2 + BrCHCOOCH_3 \longrightarrow$$

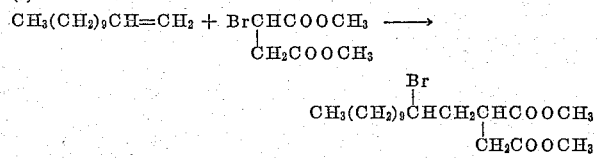

(2)

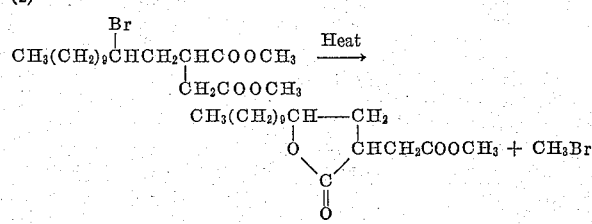

EXAMPLE III

*Preparation of tetraethylenepentamine amide of an alkylbutyrolactone-α-acetic acid derived from a butylene polymer*

An alkylbutyrolactone-α-acetic acid was prepared from a butylene polymer having a molecular weight of about 850. A 40% solution of this lactone in a hydrocarbon oil was reacted with an ethylene amine condensation product having a molecular weight corresponding to tetraethylenepentamine.

A mixture of 76 grams (0.4 mol) of this tetraethylene pentamine and 1218 grams (0.50 mol) of the product of the alkylbutyrolactone-α-acetic acid was blended with agitation at 150° C. for one hour, allowed to cool, then stand for 36 hours at room temperature. The mixture was then reheated at 150° C. for 1 hour.

Infrared analysis showed a band at 1700 cm.$^{-1}$ due to the amide carbonyl group, and a band at 1775 cm.$^{-1}$ due to the butyrolactone carbonyl group. The amide carbonyl group absorption is displaced from its characteristic position at about 1650 cm.$^{-1}$ due to the proximity of the lactone group in the molecule.

Table I hereinbelow presents data obtained with a lubricating oil composition containing 1%, by weight, of the amide obtained in Example III hereinabove in combination with metal dithiophosphates. The concentration of the dithiophosphates is expressed in millimols per kilogram of finished composition (based on the metal) that is, mM./kg.

Dithiophosphate A was a zinc salt of a mixed dialkyl dithiophosphate wherein one of the alkyl radicals contained 4 carbon atoms and the other alkyl radical contained 5 carbon atoms. Dithophosphate B was a zinc di(alkylphenyl)dithiophosphate.

The test was made in a Caterpillar L–1 engine according to Supplement I conditions for a period of 120 hours as described in the Coordinating Research Council Handbook, January 1946.

The "PD Nos." refer to the piston discoloration rating. After the engine test, the three piston lands are examined visually. To a piston skirt which is completely black is assigned a PD number of 800; to one which is completely clean, a PD number of 0; to those intermediate between completely black and completely clean are assigned PD numbers intermediate in proportion to the extent and degree of darkening.

The "GD Nos." refer to the percentage deposits in the piston ring grooves; a 0 evaluation being a clean groove; and a number of 100 being a groove full of deposits.

The base oils were California SAE 30 base oils.

*Table I*

| Additive | A | B | C |
|---|---|---|---|
| Lactone Amide, Wt. percent | 0.0 | 1.0 | 1.0 |
| Dithiophosphate: | | | |
| (A) mM./kg | 0.0 | 0.0 | 10 |
| (B) mM./kg | 0.0 | 0.0 | 2 |
| Test Results: | | | |
| GD No | [1] 39 | | 2 |
| PD No | 800, 800, 800 | | 35, 1, 2 |

[1] These test results were obtained in a Caterpillar L–1 test under the MIL–L–2104 conditions. Thus, under the more severe supplement-1 conditions, these GD Nos. would be considerably higher.

Table II hereinbelow presents data obtained in an FL–2 test, using a 6-cylinder Chevrolet engine operating at 2500 r.p.m. for a period of 36 hours, which test is fully described in a Coordinating Research Council bulletin titled "Research Technique for the Determination of the Effects of Fuels and Lubricants on the Formation of Deposits During Moderate Temperature Operation" (1948).

The piston varnish rating is a visual observation of the amount of varnish on a piston skirt, with "10" being the maximum rating for a perfectly clean piston and "0" being the rating of a piston fully covered with black varnish. This piston varnish rating correlates with road performance in automobiles.

The total rating is the overall deposit rating of the engine, with the rating values ranging from 0, the poorest value, to 100, the top value. These figures indicate the percentage rating for the engine.

The base oil was an SAE 30 base oil.

The succinimide and the dithiophosphates were the same as those described for Table I hereinabove.

Table II

| Additive | D | E | F |
|---|---|---|---|
| Lactone Amide, wt. percent | 0.0 | 1.0 | 1.0 |
| Dithiophosphate: | | | |
| (A) mM./kg. | 0.0 | 0.0 | 10 |
| (B) mM./kg. | 0.0 | 0.0 | 2 |
| Test Results: | | | |
| Piston Varnish Rating | 2.5 | -------- | 6.0 |
| Total Rating | -------- | -------- | 84.3 |

In an L-38 strip corrosion test, the copper strip weight loss was only 15.5 milligrams when using a petroleum base oil containing 6% by weight of the amide prepared as in Example III hereinabove.

Table III hereinbelow presents data obtained in an L-38 engine test, using a one cylinder CLR engine. The test period was for 40 hours.

Table III

Additive:
Amide (Example III), wt. percent _____ 2.0
Dithiophosphate A, mM./kg. _____ 10
Dithiophosphate B, mM./kg. _____ 2
Test results: Bearing weight loss (mgs.) _____ 55.4

In addition to the dithiophosphate described hereinabove, lubricating oil compositions containing the lactone amides of this invention may also contain other detergents, viscosity index improving agents, rust inhibitors, oiliness agents, grease thickening agents, etc.

I claim:
1. A lubricating oil composition comprising a major proportion of an oil of lubricating viscosity, and from 0.1% to 30% by weight of an amide of an alkylbutyrolactone-α-acetic acid of the formula:

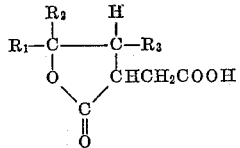

wherein $R_1$, $R_2$, and $R_3$ are selected from the group consisting of hydrogen and alkyl radicals having from 1 to 300 carbon atoms, with the total combined number of carbon atoms in $R_1$, $R_2$ and $R_3$ being at least 10 and the amine of said amide is of not more than 20 carbon atoms and of not more than 11 nitrogen atoms and is selected from the group consisting of ethylene diamine and polyethylene polyamines.

2. A lubricating oil composition comprising a major proportion of an oil of lubricating viscosity, and from 0.25% to 5% by weight of an amide of an alkylbutyrolactone-α-acetic acid of the formula:

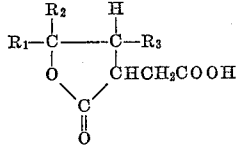

wherein $R_1$, $R_2$ and $R_3$ are selected from the group consisting of hydrogen and alkyl radicals having from 1 to 300 carbon atoms, with the total combined number of carbon atoms in $R_1$, $R_2$ and $R_3$ being at least 10 and the amine of said amide is of not more than 20 carbon atoms and of not more than 11 nitrogen atoms and is selected from the group consisting of ethylene diamine and polyethylene polyamines.

3. A composition according to claim 2 wherein said amine has from 2 to 12 carbon atoms.

4. A composition according to claim 2 where the combined number of carbon atoms in $R_1$, $R_2$, and $R_3$ is of from 12–100.

5. A composition according to claim 2 wherein said amine is tetraethylene pentamine.

6. A composition according to claim 2 wherein said amine is N-aminoethyl piperazine.

References Cited by the Examiner

UNITED STATES PATENTS 3,024,195   3/62   Drummond et al. _____ 252—51.5
3,131,150   4/64   Stuart et al. _____ 252—51.5

OTHER REFERENCES

McRae et al.: The Synthesis of 2-Ketocyclohexylsuccinic Acid and Related Substances, "Canadian Journal of Research," vol. 21B, pages 186–193 (1943).

DANIEL E. WYMAN, *Primary Examiner.*